United States Patent

Bumgardner

[11] 4,045,140
[45] Aug. 30, 1977

[54] MEANS FOR NEAR REAL TIME C-W LASER SOURCE CHARACTERIZATION

[75] Inventor: Jon H. Bumgardner, Ridgecrest, Calif.

[73] Assignee: The United States of America as represented by the Secretary of the Navy, Washington, D.C.

[21] Appl. No.: 640,504

[22] Filed: Dec. 15, 1975

[51] Int. Cl.² ............................................. G01B 11/26
[52] U.S. Cl. .................................. 356/141; 250/232; 250/203 R; 356/152; 356/172
[58] Field of Search ............. 250/203 R, 231 SE, 232, 250/233; 356/141, 152, 172; 350/314

[56] References Cited

U.S. PATENT DOCUMENTS

| 2,960,015 | 11/1960 | Rodine | 350/314 X |
| 2,961,545 | 11/1960 | Astheimer et al. | 250/203 R |
| 3,244,886 | 4/1966 | Zuckerbraun | 250/232 X |
| 3,774,997 | 11/1973 | Kott | 350/314 |

Primary Examiner—S. C. Buczinski
Attorney, Agent, or Firm—R. S. Sciascia; Roy Miller; W. T. Skeer

[57] ABSTRACT

A means for obtaining east-west and north-south information for characterizing a continuous wave laser source using either time blanking and frequency modulation or scanning with orthogonal time functions.

6 Claims, 6 Drawing Figures

MEANS FOR NEAR REAL TIME C-W LASER SOURCE CHARACTERIZATION

BACKGROUND OF THE INVENTION

In the field of position measuring systems, optical systems are sometimes employed. The optical system is remotely located from the position occupied by the object of interest, and where the object of interest is a source of radiant energy, a passive optical system may be employed to measure the position of the object. Prior passive optical systems are complicated and costly, or provide measurements that are unreliable or ambiguous and require experienced interpretation by the operator. The present invention is a simple and straight-forward technique for measuring the position of a source of optical radiation within the field of view of the system, and provides outputs that are easily processed to provide direct measurements of the object's position.

The present invention employs first and second channels, with each converting the field of view into an electrical signal that is coupled to a common gated divider. The physical difference between the two channels is that the moving slit aperture of the second includes a linear, spatially varying filter. It attenuates that channel's detection of the image of the object of interest when the filter is moved into an overlaying relationship with the image. The output of the gated divider is zero because the output of channel Y is below the threshold of G until the apertures pass over the images, at which time the output becomes non-zero, with the value being dependent on the lateral position of the object in the image because of the difference between the invariant attenuation factor of the first and the linearly varying attenuation factor of the second. Then, a pulse is provided by the gated divider. In this manner, by noting the position of the apertures, one coordinate of the object may be measured, such as elevation. And, by noting the ratio of the outputs, the second coordinate may be measured, such as azimuth. Together, the coordinates define the object's position within the system's field of view. Additionally, when more than one source may be within the system's field of view, the relative amplitudes of the sources can be identified and employed to insure that the coodinates that are measured for one source are not confused with the coordinates measured for another.

DESCRIPTION OF A PREFERRED EMBODIMENT

Figure 1:
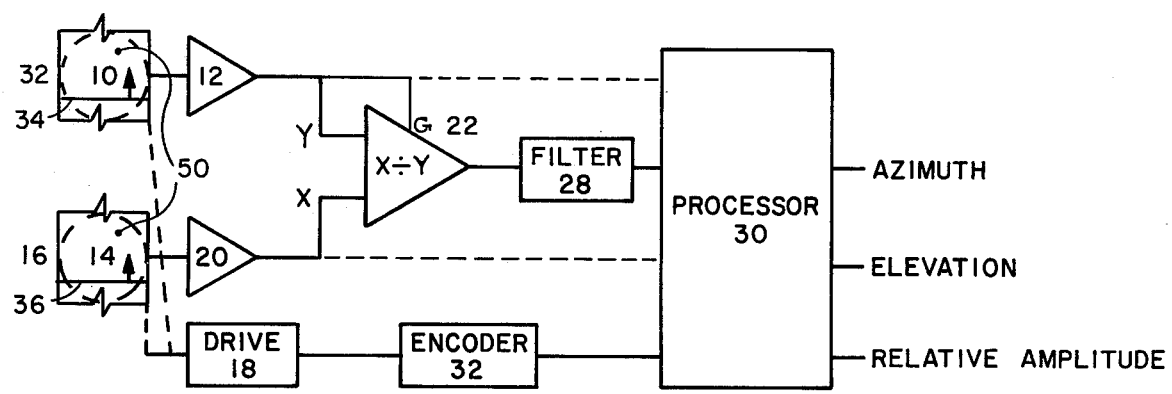
FIG. 1 is a block diagram of an embodiment of the present invention.

FIG. 1 is a block diagram of an embodiment of the present invention, and includes image generators and converters 10 and 14, each having the same field-of-view and generating identical images as the other. Image generator and converter 10 additionally includes screen 32 having moving aperture filter 34 of invariant attenuation driven by drive 18. And, image generator and converter 14 additionally includes screen 16 having moving aperture 36 of laterally varying attenuation also driven by drive 18. The apertures are synchronously driven, and their position is continuously monitored by encoder 32. The attenuation factor of aperture filter 34 may be some value such as one (1.0x), whereas the attenuation factor of aperture filter 36 is laterally variant from some value such as one-half to one (0.5 x to 1.0x).

The images generated by image generators and converters 10 and 14 are each converted into electrical signals and coupled through amplifiers 12 and 20, respectively, to dividing amplifier 22. Dividing amplifier 22 has a threshold that is established by the level of the output of amplifier 12. An output from amplifier 12 that denotes detection of a source of interest will exceed the threshold and gate divider 22. When the outputs of amplifier 12 and 20 are equal and below the threshold level, the output of dividing amplifier 22 is zero. That is what occurs when all of the radiation sources of interest within the field-of-view are screened from detection by screens 16 and 32. If aperture filters 34 and 36 are moved into alignment with a source permitting its conversion into electrical signals, the outputs of amplifier 12 and 20 will be non-zero, and the output of dividing amplifier 22 will be between one-half and one (0.5 and 1.0). Therefore, by noting the position of filters 34 and 36 when the output of dividing amplifier 22 is some value other than zero, the position of the source within the system's field-of-view is measured. Dividing amplifier 22 is connected to processer 30 by a filter 28 to improve signal-to-noise ratio in the well known manner.

The output of encoder 32, which identifies the position of filters 34 and 36, and output of dividing amplifier 22, which identifies the presence of a source of radiation-of-interest when it is some value other than zero, are coupled to processor 30. Processor 30 employs known techniques to determine the azimuth and elevation from the information provided to it. As a result, the point of origin of the radiation incident on the system is measured. Known techniques may also be employed by processor 30 to determine the relative amplitudes of more than one source within the field-of-view of the system to facilitate discriminating between them so as to avoid ambiguities that might prevent correct measurements of each point-of-origin, as will be discussed below.

Figure 2:
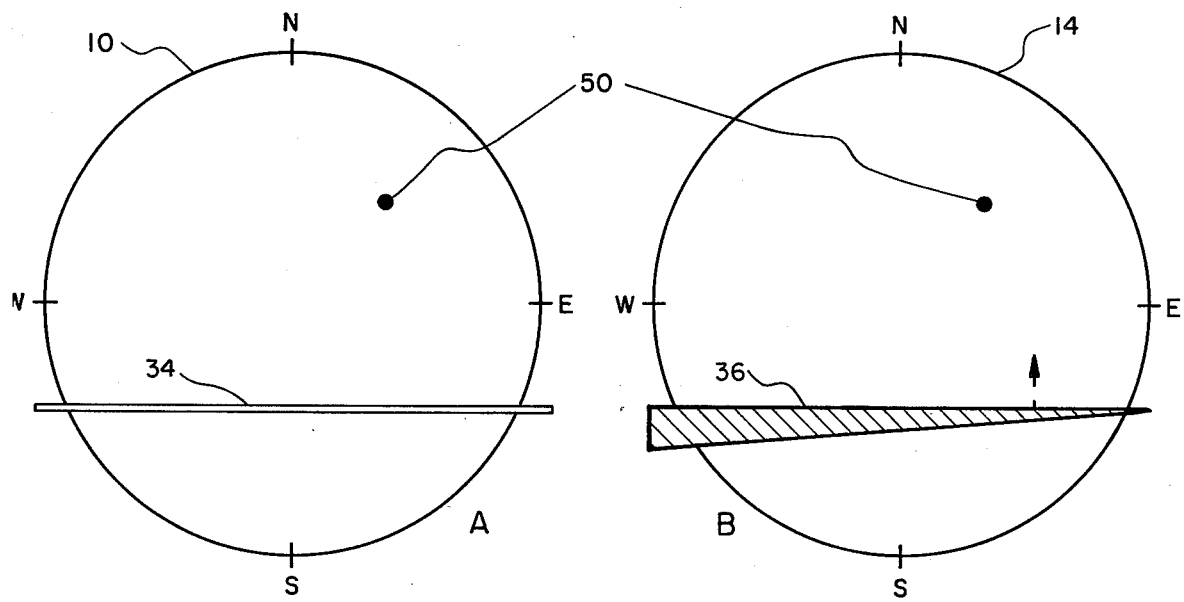
FIG. 2 A and B are schematic diagrams showing the image of the system's field of view and the moving aperture of the first channel, and the image and a graphical representation of the linearly varying line filter of the aperture of the second channel.

FIG. 2 is a graphical depiction of the images generated in image generators and converters 10 and 14, and includes a graphical representation of invariant aperture filter 34 and laterally varying filter 36. The depiction of filter 36 shows relative attenuation rather than physical dimensions. That is, the width of the filter is preferably constant over its entire length. But, its degree of attenuation varies linearly. Therefore, depiction of filter 36 in FIG. 2B shows by representation that the attentuation at one end is greater than at the other, and that the attenuation varies linearly from end to end. FIG. 2 shows that the images of image generators and converters 10 and 14 are identical (FIG. 2A and FIG. 2B, respectively). In each, radiation source 50 is screened until apertures 34 and 36 align therewith. And, the outputs of each, coupled through amplifiers 12 and 20, respectively, to dividing amplifier 22 are identical and below its threshold. As a result, the output of dividing amplifier 22 is zero.

When, however, filters 34 and 36 are driven across the images of image generators and converters 10 and 14 by drive 18. When filter 36 moves into the optical path between the image of source 50 and of the converter portion of image generator and converter 14 (which converts the image into an electrical signal), a detection signal output is provided to amplifier 20. At the same moment filter 34 moves into optical alignment with its image of source 50 and a detection signal output is provided to amplifier 12. The output appearing at amplifier 20 may be different from that appearing at amplifier 12, and will be dependent on the lateral position of source 50 within the field-of-view. The outputs will be equal if the images of the source appear at a lateral position, if any, where the attenuation factors of filters 34 and 36 are equal. Otherwise, the outputs will be different because of the difference in attenuation between filter 34 and filter 36. In any case, when the image of a source is detected, the outputs of amplifiers 12 and 20 become significant, or other than zero. And, the output of dividing amplifier 22 becomes some value other than zero, denoting that the vertical position of the filter corresponds to a position of a source within the system's field-of-view. Encoder 32 coupled to drive 18 provides position information of filters 34 and 36. The outputs of dividing amplifier 22 and encoder 32 may be coupled to processer 30 which then provides a position read-out of the source.

If the top of the images associated with image generators and converters 10 and 14 corresponds to North, the bottom to South, the right to East, and the left to West, then for source 50 appearing in the NE quadrant as shown in FIG. 2, the following would occur: The outputs of amplifiers 12 and 20 would be equal until filters 34 and 36 were beyond the EW axis, and had intersected image 50. At that moment the output of amplifier 12 would be increased, and the output of amplifier 20 would also be increased but to a lesser extent dependent on the attenuation factor. Dividing amplifier 22 would then provide an output other than zero. An output of dividing amplifier 22 that is other than zero denotes the presence of a source of interest within the field-of-view. Monitoring of filters 34 and 36 by encoder 32 would identify the source as being in the Northern hemisphere along a particular line corresponding to the line then occupied by the filters, that is, the elevation of the source. The value of the output of amplifier 22 identifies the degree of attenuation of the image in the image generator and converter 14 by filter 36, and thereby, identifies the position along the length of filter 36 corresponding to the source, that is, the lateral or azimuthal position of the source. Processer 30 may be employed to correlate the data by known techniques, such as by determining the point at which the two lines cross, to measure the point-of-origin of the radiation. In the example, it resides at a point in the NE quadrant, as shown in FIG. 2.

Figure 3:
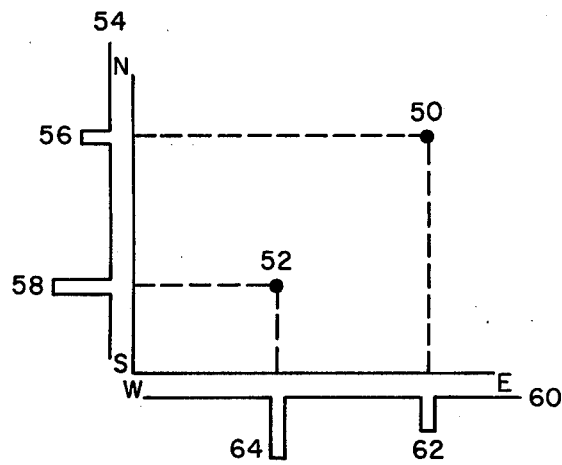
FIG. 3 is a graphic representation showing a technique of the present invention for discriminating between multiple sources within the systems field of view.

FIG. 3 shows a graphical representation of a technique for differentiating between multiple sources appearing within the field of view.

It shows actually two orthogonal sweeps, which could be obtained by causing 34 and 36 to sweep together bottom to top, and then together from left to right. In the event that the system likelihood of having multiple targets on a given location of 34 (and 36) is other than insignificant, two orthogonal sweep patterns could be made, as is shown in FIG. 3, or any desired number of linearly independent sweep orientations, thus allowing the processor to sort out any spurious signals caused by simultaneous target crossing by any one particular sweep orientation. By additionally sending the raw X and Y signals to processor 30, pure amplitude correlations could easily simplify this recording matrix, if desired.

The technique associated with FIG. 3 employs calculating the relative amplitudes of the radiation detected (i.e., signals X and Y) and correlating data corresponding to like amplitudes only. That is, if source 50 has an amplitude one-half that of source 52, and both appear within the system's field of view, the data corresponding to the lesser value measures the point-of-origin of source 50. Likewise, the data corresponding to the greater value can be correlated to identify the point-of-origin of source 52. As shown in FIG. 3, trace 54 resulting from the movement of the filters from N to S shows both lesser amplitude 56 and greater amplitude 58. Likewise, trace 60, determined from the relative amplitudes of the converters' outputs shows lesser value 62 and greater value 64. By correlating only the lesser values, i.e. values 56 and 62, the point-of-origin of source 50 is measured without confusion with the other source that appears within the field of view. Likewise, by correlating greater values 58 and 64, the point-of-origin of source 52 is measured.

All of the components necessary for implementation of the present invention are presently available in the art. For example, image generators and converters 10 and 14 may be any number of available devices including lateral photodetectors with appropriate input optics. Filters 34 and 36 may be aperture filters in driven screen panels. Encoder 32 may be any of several available devices which can monitor the position of drive 18. And, processer 30 may be any of a number of systems, the selection of which may be determined by the processing speed and resolution required for correlating the data generated and providing outputs definitive of a point of correlation. In the present invention the point of correlation is identified by azimuth and elevation. Processer 30 may also include a processing means for monitoring the relative amplitudes of the data and maintaining proper separation in the correlator between data of dissimiliar amplitudes.

To those skilled in the art it will be obvious upon a study of this disclosure that the present invention permits a variety of modifications and hence can be given embodiments other than those particularly illustrated and described herein, without departing from the essential features of the invention and within the scope of the claims annexed hereto.

I claim:

1. A system for locating the source of radiation incident on said system, comprising:
   optical means for presenting two images of the field-of-view of said system:
   detecting means optically cooperating with said optical means for providing an electrical output indicative of each image;
   two optical modulation filters having finite lengths and attenuation factors, each filter movable across one of said images for occupying a portion of the optical path between the image and said detection means and wherein the attenuation factor of the filter moving across one of said images is invariant in a direction perpendicular to its movement, and the attenuation factor of the filter moving across the other image varies linearly in a direction perpendicular to its movement;

circuit means electrically connected to said detection means for comparing the amplitudes of the outputs said detecting means associated with each of said images with one another; and means for sensing the position of at least one of said plurality of optical filters and providing an electrical analog of said position at the time of the comparison performed by said circuit means, whereby said position corresponds to the point of origin of said radiation within said field-of-view in at least one dimension.

2. The system of claim 1 wherein said two filters are mounted on separate screens for each image and each of said two filters has a total attenuation factor that is different from the other of said filters.

3. The system of claim 2 wherein the attenuation factor of one of said filters is one (1.0x), and the attenuation factor of the other of said filters varys linearly from one-half to one (0.5x to 1.0x).

4. The system of claim 1 wherein said circuit means is a dividing amplifier for comparing output of the detector associated with one of said filters and the output of the detector associated with the other of said filters.

5. The system of claim 2 wherein said position sensing means further includes:

drive means coupled to each of the aforesaid screens for moving each of said filters in synchronism with one another;

an encoder connected to said drive means for sensing the position of said filters by continuously monitoring said drive means.

6. The system of claim 5 wherein said system includes a processor electrically coupled to said dividing amplifier and said encoder for providing an output identifying the position of the source of said radiation within said field-of-view.

* * * * *